(12) United States Patent
Funari et al.

(10) Patent No.: US 10,214,887 B2
(45) Date of Patent: Feb. 26, 2019

(54) DIAPHRAGM DISK

(71) Applicant: Zurn Industries, LLC, Milwaukee, WI (US)

(72) Inventors: Michael A. Funari, Apex, NC (US); Larry M. Elting, Whispering Pines, NC (US); Jerome S. Markijohn, Sanford, NC (US)

(73) Assignee: Zurn Industries, LLC, Milwaukee, WI (US)

( * ) Notice: Subject to any disclaimer, the term of this patent is extended or adjusted under 35 U.S.C. 154(b) by 9 days.

(21) Appl. No.: 15/195,036

(22) Filed: Jun. 28, 2016

(65) Prior Publication Data

US 2016/0305105 A1 Oct. 20, 2016

Related U.S. Application Data

(62) Division of application No. 14/164,580, filed on Jan. 27, 2014, now Pat. No. 9,399,861.

(60) Provisional application No. 61/757,988, filed on Jan. 29, 2013.

(51) Int. Cl.
*E03D 3/06* (2006.01)
*F16K 31/385* (2006.01)

(52) U.S. Cl.
CPC ............ *E03D 3/06* (2013.01); *F16K 31/3855* (2013.01); *Y10T 137/0491* (2015.04)

(58) Field of Classification Search
CPC .. E03D 3/06; F16K 31/3855; Y10T 137/0491
USPC .......................................... 137/15.18; 251/40
See application file for complete search history.

(56) References Cited

U.S. PATENT DOCUMENTS

| | | | |
|---|---|---|---|
| 1,689,540 A | 10/1928 | Watrous |
| 1,803,418 A | 5/1931 | White |
| 1,964,111 A | 6/1934 | Dobrick |
| 2,007,677 A | 7/1935 | Farmer |
| 2,066,086 A | 12/1936 | Wilson |
| 2,217,166 A | 10/1940 | Groeniger |
| 2,630,831 A | 3/1953 | Arnold |
| 3,011,751 A | 12/1961 | Delany et al. |
| 3,166,289 A | 1/1965 | Engstrom |
| 3,279,742 A | 10/1966 | Billeter |
| 3,347,519 A | 10/1967 | Engstrom |
| 3,399,860 A | 9/1968 | Billeter et al. |
| 3,656,499 A | 4/1972 | Nelson et al. |
| 3,791,618 A | 2/1974 | Nelson et al. |
| 4,022,114 A | 5/1977 | Hansen, III et al. |
| 4,327,891 A | 5/1982 | Allen et al. |
| 4,971,287 A | 11/1990 | Shaw |
| 5,150,877 A | 9/1992 | Whiteside et al. |

(Continued)

*Primary Examiner* — Eric Keasel
(74) *Attorney, Agent, or Firm* — Quarles & Brady LLP

(57) ABSTRACT

A diaphragm type flush valve for use with toilet devices such as urinals and water closets that includes a valve member, a diaphragm, a guide member extends downwardly from the diaphragm, and a disk positioned on top of the diaphragm. The disk is threadably attached to the guide member and functions to secure the diaphragm, the disk, and the guide member into the valve member. The disk includes a rigid body made of a composite material and a seal member made of an adhesive and a thin layer of rubber, with the seal member having a portion on an upper surface of the disk for sealing contact with a relief valve. The disk also includes a plurality of spaced protrusions and inwardly directed on its upper surface in order to add accuracy and stability to the diaphragm assembly.

6 Claims, 3 Drawing Sheets

(56) References Cited

U.S. PATENT DOCUMENTS

| | | |
|---|---|---|
| 5,232,194 A | 8/1993 | Saadi et al. |
| 5,295,655 A | 3/1994 | Wilson et al. |
| 5,332,192 A | 7/1994 | Whiteside |
| 5,335,694 A | 8/1994 | Whiteside |
| 5,415,374 A | 5/1995 | Carroll et al. |
| 5,465,748 A | 11/1995 | Bowers |
| 5,649,686 A | 7/1997 | Wilson |
| 6,105,926 A | 8/2000 | Oliver et al. |
| 6,183,636 B1 | 2/2001 | Bowers et al. |
| 6,382,586 B1 | 5/2002 | Wilson et al. |
| 6,550,744 B2 | 4/2003 | Nortier |
| 6,616,118 B2 | 9/2003 | Nortier |
| 6,616,119 B2 | 9/2003 | Wilson |
| 6,913,239 B2 | 7/2005 | Nortier |
| 6,926,247 B2 | 8/2005 | Nortier |
| 7,556,237 B2 | 7/2009 | Johnson |
| 7,607,635 B2 | 10/2009 | Wilson |
| 7,980,528 B2 | 7/2011 | Wilson |
| 8,172,275 B2 | 5/2012 | Sumrall, Jr. et al. |
| 8,286,934 B2 | 10/2012 | Wilson |
| 8,881,755 B2 | 11/2014 | Thomas et al. |
| 2004/0239021 A1 | 12/2004 | Itoh et al. |
| 2005/0087710 A1 | 4/2005 | Nortier |
| 2005/0224735 A1 | 10/2005 | Funari et al. |
| 2007/0161940 A1 | 7/2007 | Blanchard et al. |
| 2008/0006788 A1 | 1/2008 | Johnson |
| 2008/0006789 A1 | 1/2008 | Johnson |
| 2008/0196159 A1 | 8/2008 | Lee |
| 2008/0290311 A1 | 11/2008 | O'Connor et al. |
| 2009/0039299 A1 | 2/2009 | Wilson |
| 2009/0284005 A1 | 11/2009 | Sumrall, Jr. et al. |
| 2010/0299820 A1 | 12/2010 | Chen |
| 2011/0094604 A1 | 4/2011 | Thomas et al. |
| 2011/0150602 A1 | 6/2011 | Sieper et al. |
| 2011/0186163 A1 | 8/2011 | Farag |
| 2011/0248197 A1 | 10/2011 | Wilson |

DIAPHRAGM DISK

CROSS REFERENCE TO RELATED APPLICATIONS

This application is a divisional of U.S. patent application Ser. No. 14/164,580, filed Jan. 27, 2014, which claims the benefit of U.S. Provisional Patent Application No. 61/757,988, filed Jan. 29, 2013, entitled "Diaphragm Disk", which is hereby incorporated by reference in its entirety.

BACKGROUND OF THE INVENTION

Field of the Invention

The present invention relates to diaphragm flush valves for use in water closets and urinals and, more particularly, to a diaphragm disk for use in a diaphragm flush valve.

In particular the invention relates to improving the accuracy and stability of the flush valve. The diaphragm disk of the present invention is made out of composite material having a rubber layer over a portion of the disk making it less expensive than the prior art rubber-coated brass disks. The diaphragm disk of the present invention also includes a plurality of short and rounded extensions circumferentially spaced around the disk making it more accurately and stably centered on the diaphragm.

Description of Related Art

Flush valves in water closets, urinals, and other plumbing devices which utilize a flexible diaphragm to establish and to seal off the connection between the inlet and outlet are well-known in the art. Typically, these flush valves have diaphragm assemblies that include diaphragm disks. The purpose of such disks is two-fold; namely to provide for the assembly of diaphragm components without the necessity of adhesive by securing a diaphragm to a guide member; and to provide a seal between the disk and a relief valve and between the disk and the diaphragm.

Diaphragm disks of the prior art use brass threads to secure the diaphragm to the guide member. The use of brass for the diaphragm disk increases the weight of the disk as well as the manufacturing costs.

A typical prior art diaphragm flush valve assembly is shown in FIG. 1 of U.S. Pat. No. 5,232,194 to Saadi et al. and is incorporated herein by reference.

SUMMARY OF THE INVENTION

The present invention relates to diaphragm flush valves for use in water closets and urinals and, more particularly, to an improved diaphragm disk for securing the diaphragm to the guide in a diaphragm flush valve and to provide a seal between the disk and the relief valve and between the disk and the diaphragm.

According to an embodiment of the invention, a diaphragm flush valve is provided. The flush valve includes a body having an inlet connection and an outlet connection. A diaphragm assembly includes a diaphragm connected to a diaphragm disk and a relief valve. When the flush valve is operated, the relief valve is lifted off of its seat on the diaphragm disk which will allow the discharge of water.

The improved diaphragm disk of the present invention is made out of composite material having a rubber layer over a portion of the disk making it lighter and less expensive than the prior art rubber-coated brass disks. The diaphragm disk of the present invention also includes a plurality of short and rounded extensions circumferentially spaced around the disk making it more accurately and stably centered on the diaphragm.

In another embodiment, the invention is a diaphragm flush valve for use with toilet devices, such as urinals and water closets, including a body having an inlet and an outlet, a valve seat between the inlet and outlet, and a valve member movable to a closing position on the valve seat to stop flow between the inlet and outlet, the valve member including a diaphragm peripherally attached to the body, a pressure chamber above the diaphragm for holding the valve member on the valve seat, a disk positioned on top of the diaphragm, a guide member extending downwardly from the diaphragm, the disk being attached to the guide member and connecting said diaphragm, said disk, and said guide member forming said valve member, the disk including a rigid body and a seal member, the seal member having a portion on an upper surface of the disk for sealing contact with a relief valve extending through the disk and the guide member, the disk having a portion on a lower surface thereof for contact with the diaphragm, the disk having a plurality of inwardly directed protrusions, wherein the rigid body is made of a composite material. In another embodiment, the invention is a process of making the diaphragm disk described above including, forming a disk made of a composite material for use in a diaphragm type flush valve assembly, applying an adhesive to the disk, and molding a layer of rubber onto the upper surface of the disk. In another embodiment, the composite material includes glass infused polyphthalamide. In another embodiment, the disk includes an outward tapered surface. In another embodiment, the plurality of inwardly directed protrusions are formed integral with the disk. In another embodiment, the plurality of inwardly directed protrusions are spaced about the upper surface of the disk. In another embodiment, the plurality of inwardly directed protrusions are configured to center the relief valve on the upper surface of the disk. In another embodiment, the seal member having the portion on the upper surface of the disk, includes a molded seal for sealing contact with the relief valve. In another embodiment, the disk includes a sealing surface of rubber overmolded over the portion on the upper surface of the disk. In another embodiment, the upper surface of the disk includes a seal formed from an adhesive and a sealing material. In another embodiment, the sealing material is a rubber. In another embodiment, the upper surface of the disk includes a seal formed from a rubber, an adhesive, and a sealing material.

In another embodiment, the invention is a diaphragm disk for use in a diaphragm flush valve for use with toilet devices such as urinals and water closets, including a body having an inlet and an outlet, a valve seat between the inlet and outlet, and a valve member movable to a closing position on the valve seat to stop flow between the inlet and outlet, the valve member including a diaphragm peripherally attached to the body, a pressure chamber above the diaphragm for holding the valve member on the valve seat, the diaphragm disk including, a body positioned on top of the diaphragm, a guide member extending downwardly from the diaphragm, the body being attached to the guide member, the body including a rigid body and a seal member, the seal member having a portion on an upper surface of the body configured for sealing contact with a relief valve extending through the body and the guide member, the body having a portion on a lower surface thereof configured for contact with the diaphragm, the body having a plurality of inwardly directed protrusions configured to center the relief valve on the upper surface of the body, wherein the rigid body is made of a composite material. In another embodiment, the upper surface of the body includes a seal formed from an adhesive and a sealing material.

In another embodiment, the invention is a method of making a diaphragm disk for use in a diaphragm flush valve for use with toilet devices such as urinals and water closets, including a body having an inlet and an outlet, a valve seat between the inlet and outlet, and a valve member movable to a closing position on the valve seat to stop flow between the inlet and outlet, the valve member including a diaphragm peripherally attached to the body, a pressure chamber above the diaphragm for holding the valve member on the valve seat, the method of making the diaphragm disk, including the steps of: forming a disk made of a composite material for use in a diaphragm type flush valve assembly, applying an adhesive to the disk, and molding a layer of rubber onto the upper surface of the disk. In another embodiment, the disk includes a guide member extending downwardly from the diaphragm, the disk being attached to the guide member and connecting the diaphragm, the disk, and the guide member forming said valve member, and wherein the disk includes a rigid body and a seal member, the seal member having a portion on an upper surface of the disk for sealing contact with a relief valve extending through the disk and the guide member, the disk having a portion on a lower surface thereof for contact with the diaphragm, the disk having a plurality of inwardly directed protrusions. In another embodiment, the composite material includes glass infused polyphthalamide. In another embodiment, the plurality of inwardly directed protrusions are formed integral with the disk. In another embodiment, the plurality of inwardly directed protrusions are spaced about the upper surface of the disk. In another embodiment, the plurality of inwardly directed protrusions are configured to center the relief valve on the upper surface of the disk.

Further details and advantages of the invention will become clear upon reading the following detailed description in conjunction with the accompanying drawing figures, wherein like parts are designated with like reference numerals throughout.

DESCRIPTION OF THE PREFERRED EMBODIMENTS

For purposes of the description hereinafter, spatial orientation terms, if used, shall relate to the referenced embodiment as it is oriented in the accompanying drawing figures or otherwise described in the following detailed description. However, it is to be understood that the embodiment described hereinafter may assume many alternative variations and embodiments. It is also to be understood that the specific devices illustrated in the accompanying drawing figures and described herein are simply exemplary and should not be considered as limiting.

Figure 1:
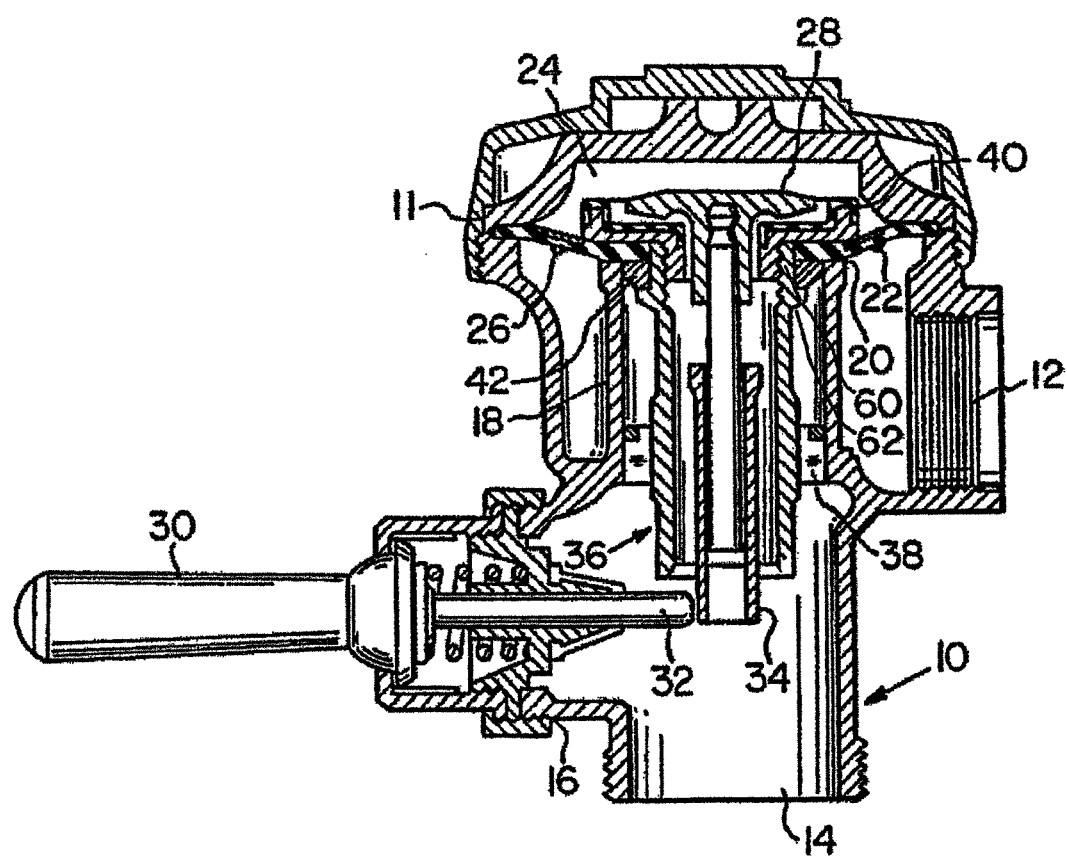
FIG. 1 is a prior art illustration of a flush valve and conventional diaphragm assembly.

FIG. 1 illustrates a typical diaphragm flush valve assembly for use in water closets and urinals. As shown in FIG. 1, a typical diaphragm flush valve assembly has a hollow body 10 and includes an inlet connection 12, an outlet connection 14, and a handle connection 16. Barrel 18 is positioned within the flush valve such that the connection between inlet 12 and outlet 14 is through barrel 18. An annular main valve seat 20 is formed on the top of the barrel 18. Annular main valve seat 20 is normally closed by diaphragm 22 extending across body 10 and defining an upper chamber 24. Diaphragm 22 has a bypass 26 which provides fluid communication between the inlet side of the flush valve and upper chamber 24. Diaphragm 22 is attached at its outer edge to the valve body and is clamped in place by an annular clamping rim on the outer cover 11 of body 10. The center of diaphragm 22 has an opening which allows for fluid communication between upper chamber 24 and outlet connection 14. A relief valve 28 normally closes the opening at the center of the diaphragm.

The operation of the flush valve is generally as follows. In the normally closed position shown in FIG. 1, water pressure at the valve inlet is communicated to upper chamber 24 through bypass 26. Since the surface area which is subjected to water pressure is greater on the upper side of diaphragm 22, the water pressure forces diaphragm 22 down onto valve seat 20 preventing water from flowing to outlet connection 14. When the user moves the handle 30 in any direction, the plunger 32 moves inwardly tilting the stem 34 of relief valve 28. This releases the pressure in upper chamber 24 by allowing water to flow through a guide member 36. With the upper chamber pressure relieved, the inlet water pressure forces diaphragm 22 upwardly, off main valve seat 20 allowing water to flow directly from inlet 12 through barrel 18 to outlet connection 14. When diaphragm 22 and relief valve 28 move upwardly, relief valve 28 resets itself, closing off upper chamber 24. Water will then flow through bypass 26 into upper chamber 24 until diaphragm 22 is again forced against main valve seat 20, thereby closing the valve. Guide member 36 moves with diaphragm 22 and includes outwardly extending radial wing members 38 which engage the inner surface of barrel 18 to guide the guide member 36 and attached diaphragm 22 as diaphragm 22 moves up and down.

The diaphragm assembly, in addition to diaphragm 22, relief valve 28, stem 34, guide member 36, and wing members 38, includes a diaphragm disk 40, as well as a flow ring 42.

The diaphragm disk 40 of the present invention, which is shown in details in FIGS. 2-5, is designed to be utilized in flush valves of the types illustrated in FIG. 1 to replace the costly and heavy diaphragm disks of these assemblies. The diaphragm disk 40 includes a body 54 which has a downwardly extending cylindrical portion 56. The portion 56 is exteriorly threaded, at 58, to mate with an interior thread 60 on the guide member 36. The exterior of guide member 36 has a shoulder 62 which supports the flow ring 42, as shown in FIG. 1, with the upper surface of the flow ring 42 supporting the lower surface of the diaphragm 22. Accordingly, the diaphragm disk 40 is threaded to the guide member 36, the guide member 36 supports the flow ring 42, and the diaphragm 22 is captured between the top of the flow ring 42 and the lower surface of the guide member 36, with this combination of elements, together, forming the diaphragm assembly.

The initial thread of the threaded area 58, as indicated at 76, may be blunt to provide ease of starting the threading movement of the disk into the guide member 36. In addition, the effect of the downward extension of cylindrical portion 56 of the diaphragm disk body is to extend the disk further into the guide, furthering connection between these two members.

Figure 2:
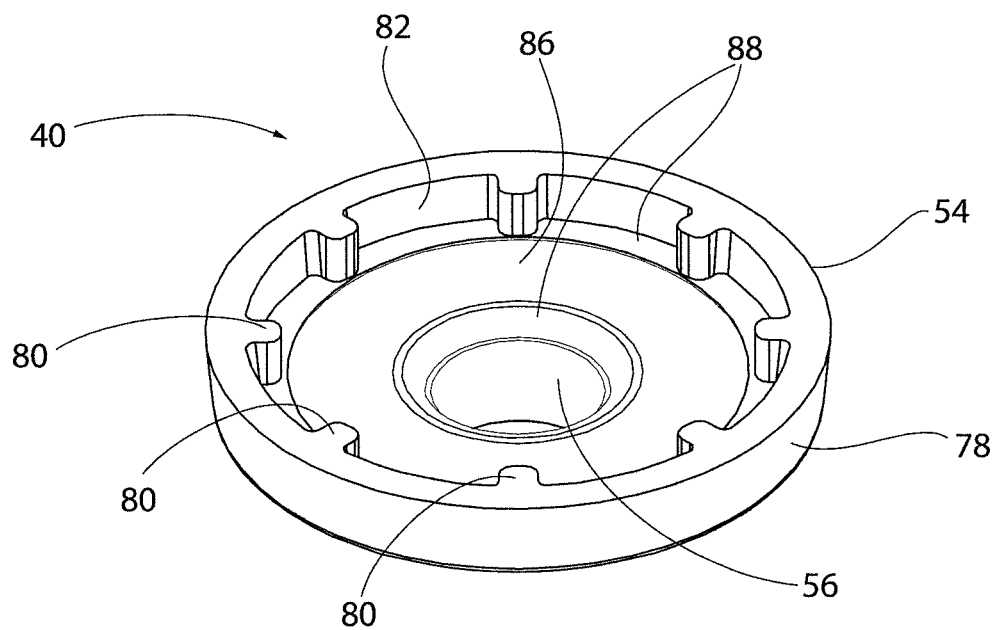
FIG. 2 is a perspective view of the upper surface of the diaphragm disk of the diaphragm flush valve assembly of the present invention.
Figure 3:
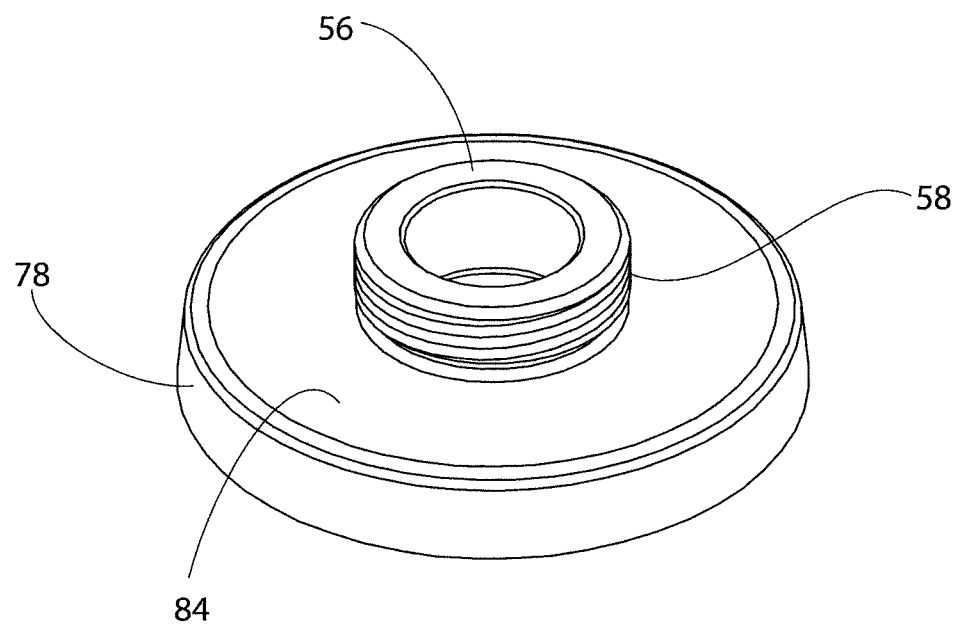
FIG. 3 is a perspective view of the lower surface of the diaphragm disk of the diaphragm flush valve assembly of the present invention.
Figure 4:
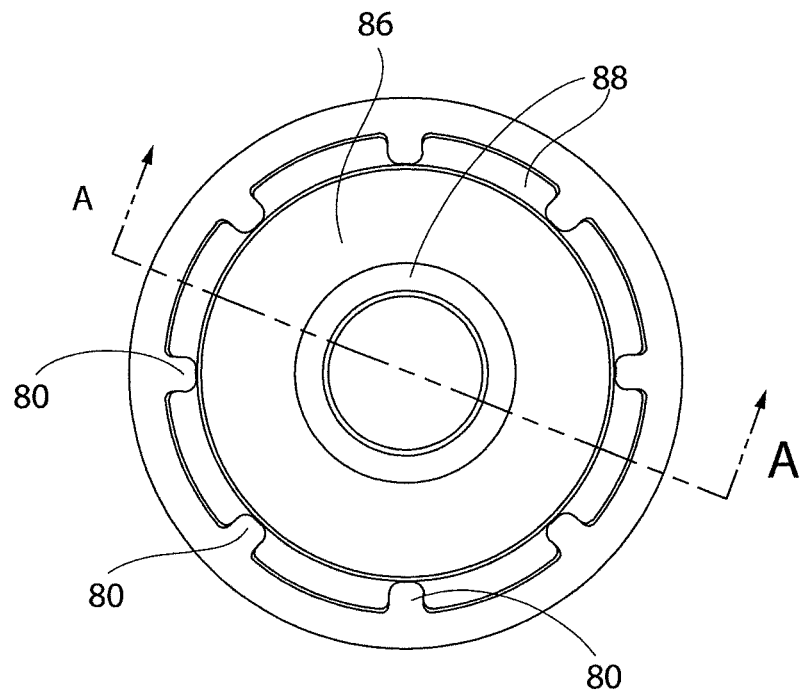
FIG. 4 is a top view of the diaphragm disk of the diaphragm flush valve assembly of FIGS. 2 and 3.
Figure 5:
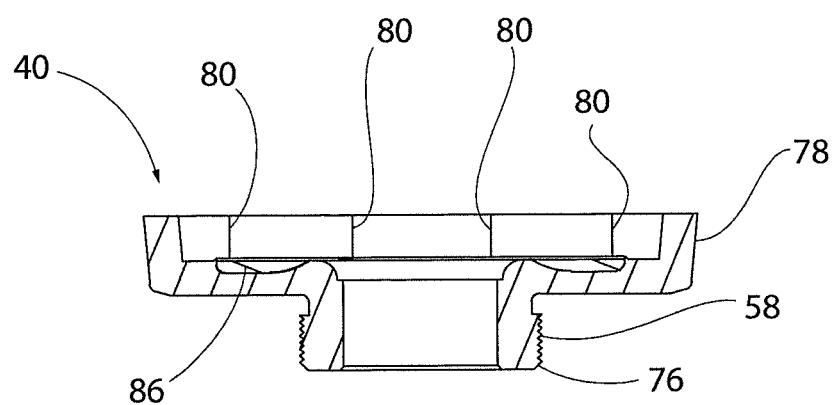
FIG. 5 is a sectional view of the diaphragm disk along A-A of FIG. 4.

With reference to FIGS. 2 and 3, the disk 40 has a partial molded seal on the surface including the upper surface 82 of the body 54, which may have an outward tapered surface 78. In the preferred embodiment shown in FIGS. 2, 4, and 5, the upper surface 82 of the disk 40 includes a trip-seal surface of rubber overmold over the portion 86 of the upper surface. The disk 40 of the present invention also has a plurality of inwardly directed protrusions 80, integral with the body 54, with the protrusions functioning to accurately and stably center the relief valve 28 and to provide more effective and consistent operation of the flush valve. The protrusions 80 are equally spaced about the cylindrical portion 56 and assist in centering the relief valve 28. Preferably the body 54 is rigid and may be formed of a composite material such as glass infused polyphthalamide, although the invention should not be so limited. The disk seal has an upper surface 82, shown in FIG. 2. The upper surface 82 will support the relief valve 28 and form a seal with the relief valve 28 to close off the pressure chamber 24. The lower surface 84 of the disk 40 will seat upon the diaphragm 22 and form a seal with the diaphragm 22 and will be compressed against the diaphragm 22 by the disk/guide member connection via the disk's threads 58. The seal may extend from the interior of cylindrical portion 56 of the diaphragm disk to its outside periphery 78, as indicated in FIGS. 2 and 3. In the preferred embodiment, a suitable adhesive is on the outer and inner portions 88 of the upper surface of the disk body 82 and a thin layer of rubber is molded onto a small portion 86 of the upper surface of the diaphragm disk body. Preferably the seal may be made of rubber, adhesive, and/or any other suitable sealing material. It is important that the seal material, rubber, and adhesive, as well as the material forming the diaphragm disk body, be made of materials which meet NSF/ANSI Standard 61 and prevent any corrosive or undesired chemical activity with the water flowing through the flush valve.

The present invention is also directed to a process of making the diaphragm disk described above by forming a suitably shaped composite diaphragm disk, spraying it with an adhesive, and molding a thin layer of rubber onto a portion of the upper surface of the disk.

Whereas the preferred embodiment of the invention has been shown and described herein, it should be realized that there may be many modifications, substitutions, and alterations thereto.

While specific embodiments of the invention have been described in detail, it will be appreciated by those skilled in the art that various modifications and alternatives to those details could be developed in light of the overall teachings of the disclosure. The presently preferred embodiment described herein is meant to be illustrative only, and not limiting as to the scope of the invention, which is to be given the full breadth of the appended claims and any and all equivalents thereof.

The invention claimed is:

1. A method of making a diaphragm disk for use in a diaphragm flush valve for use with toilet devices, the diaphragm flush valve including a body having an inlet and an outlet, a valve seat between said inlet and outlet and a valve member movable to a closing position on said valve seat to stop flow between said inlet and outlet, said valve member, including a diaphragm peripherally attached to said body, a pressure chamber above said diaphragm for holding said valve member on said valve seat, the method of making the diaphragm disk comprising the steps of:
    forming a disk body made of a composite material for use in the diaphragm flush valve in which the disk body is a rigid body,
    applying an adhesive to said disk body, and
    molding a layer of rubber onto a recessed area of the upper surface of said disk body to form the diaphragm disk, wherein the layer of rubber is a seal member providing a sealing surface on the upper surface of the disk body in which the sealing surface is configured to provide sealing contact with a relief valve extending through the disk body.

2. The method of making a diaphragm disk according to claim 1, wherein said disk body has a portion on a lower surface thereof for contact with said diaphragm and said disk body has plurality of inwardly directed protrusions.

3. The method of making a diaphragm disk according to claim 1, wherein the composite material comprises a glass infused polyphthalamide.

4. The method of making a diaphragm disk according to claim 2, wherein the plurality of inwardly directed protrusions are formed integral with said disk body.

5. The method of making a diaphragm disk according to claim 2, wherein the plurality of inwardly directed protrusions are spaced about the upper surface of said disk body.

6. The method of making a diaphragm disk according to claim 2, wherein the plurality of inwardly directed protrusions are configured to center said relief valve on the upper surface of said disk body.

\* \* \* \* \*